Dec. 28, 1948.  H. W. PRICE  2,457,721
PRESSURE FLUID FOLLOW-UP SERVOMOTOR
Filed Dec. 29, 1943  2 Sheets-Sheet 1

INVENTOR.
HAROLD W. PRICE
BY H. O. Clayton
ATTORNEY

Dec. 28, 1948.   H. W. PRICE   2,457,721
PRESSURE FLUID FOLLOW-UP SERVOMOTOR
Filed Dec. 29, 1943   2 Sheets-Sheet 2

INVENTOR.
HAROLD W. PRICE
BY H.O. Clayton
ATTORNEY

Patented Dec. 28, 1948

2,457,721

UNITED STATES PATENT OFFICE 2,457,721

PRESSURE FLUID FOLLOW-UP SERVOMOTOR

Harold W. Price, South Bend, Ind., assignor to Bendix Aviation Corporation, South Bend, Ind., a corporation of Delaware Application December 29, 1943, Serial No. 516,034

3 Claims. (Cl. 121—41)

This invention relates in general to power means for operating certain controls of an automotive vehicle and in particular to pressure differential operated means for operating any one of the friction clutch, the change-speed transmission or the wheel brakes of said vehicle.

The most important object of my invention is to provide a simple and compact clutch, brake or transmission operating power unit constituting the principal part of a clutch, brake or transmission operating means said unit including a single-acting motor, preferably of the vacuum suspended type, said motor being controlled by a follow-up valve housed within said motor and operated by linkage operable to effect both the follow-up action of the valve and the so-called feel control of the power means that is the resistance encountered by the driver in his operation of the control lever said resistance advising the driver of the degree of force being exerted by the motor during the actuation of the clutch, brakes or transmission as the case may be.

Yet another object of my invention is to provide a simple pressure differential operated motor which houses both its control valve and linkage operable to obtain the aforementioned feel during the operation of the motor.

Other objects and advantages of the power means constituting my invention will become apparent to those skilled in the art from a study of the drawings and description to be presently set forth in this application.

Figure 1:
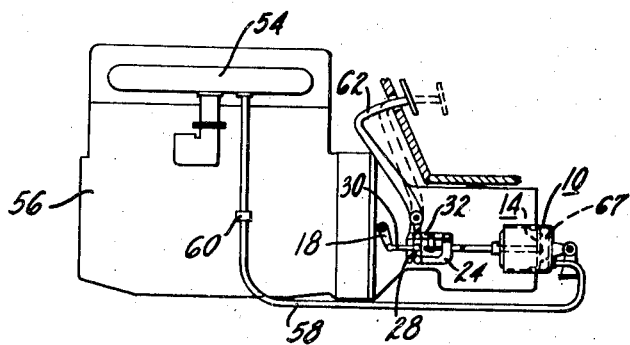
Figure 1 is a diagrammatic view disclosing one embodiment of the power unit constituting my invention said unit constituting part of the means for operating the friction clutch of the vehicle.
Figure 2:
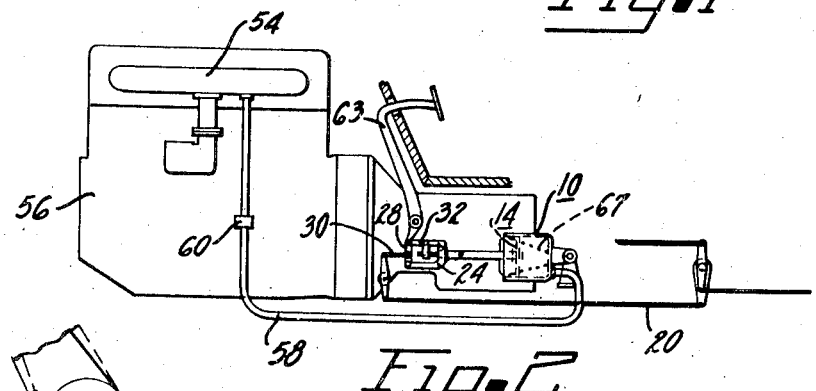
Figure 2 is a view disclosing the power unit of Figure 1 connected to operate the wheel brakes of the vehicle.
Figure 3:
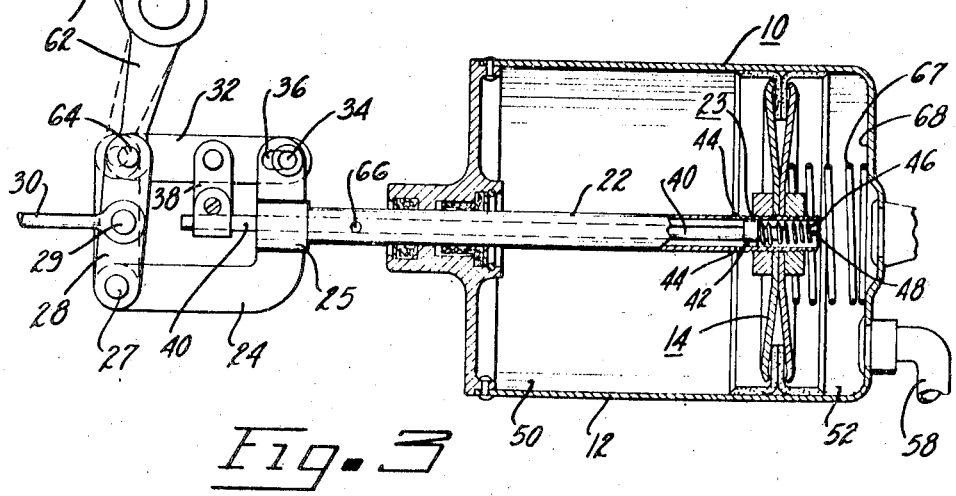
Figure 4:
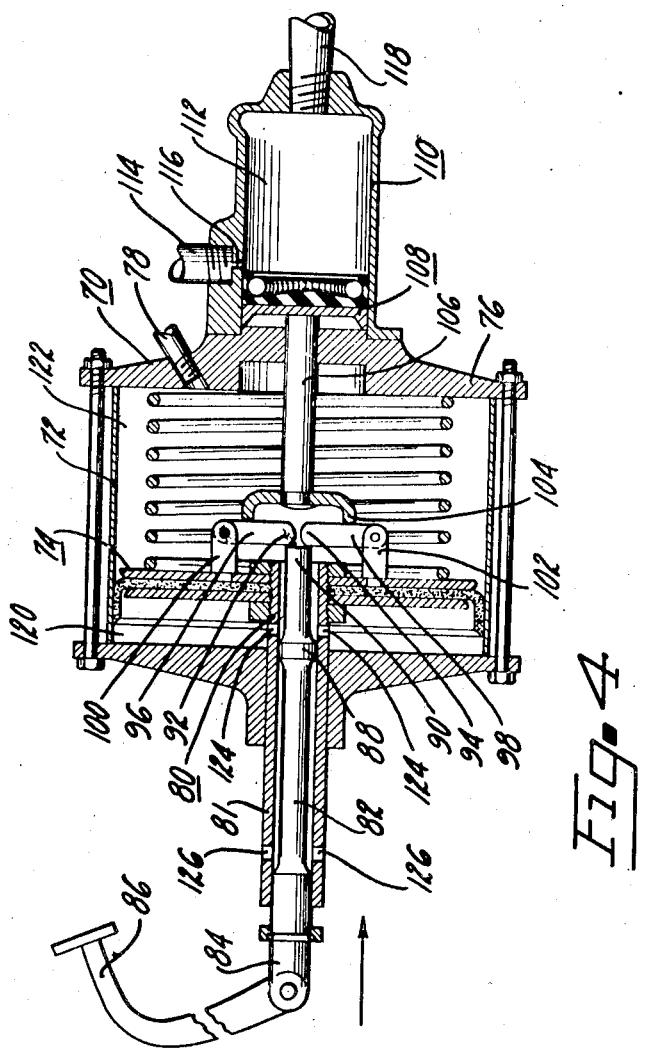

Figure 3 is an enlarged view of the power unit of Figures 1 and 2 the motor being shown in section to disclose the details of the control valve housed within the motor and the linkage for operating said valve and for obtaining feel also being shown; and Figure 4 is a sectional view of another embodiment of the power unit constituting my invention said embodiment including a vacuum suspended motor housing a follow-up control valve and also housing the force transmitting linkage for operating said valve and for obtaining the desired feel.

Referring now to Figures 1 to 3 inclusive disclosing the preferred embodiment of my invention a vacuum suspended motor 10 includes a casing 12 and a power element 14 said casing being pivotally mounted to any suitable part of the chassis of the vehicle or a member fixedly secured thereto. The power element 14, preferably a piston of conventional structure, is connected by force transmitting means to the means to be operated such as a friction clutch operating crank 16, Figure 1, or wheel brake operating linkage 20, Figure 2, said force transmitting means including a tubular rod 22 one end of which constitutes a valve member 23 which is detachably secured to the piston 14. The other end of the rod 22 is slidably mounted within one of the ends of the cylinder 12. An angular shaped link 24 is provided with a tubular portion 25 sleeved over and fixedly secured to the enlarged tubular shaped end portion of the rod 22; and to one end of said link there is pivotally connected at 27 a link 28. To the central portion of the link 28 there is pivotally connected at 29 a rod 30 which is connected to either the aforementioned clutch or brake operating means disclosed in Figures 1 and 2 respectively. To the upper end of the link 28 there is pivotally connected one end of a link 32 extending substantially at right angles thereto; and to the other end of the link 32 there is fixedly secured a pin 34 which extends through a slot 36 in the upper end of the link member 24. A link 38 is fixedly secured at its upper end to the central portion of the link 32 and the lower end of the link 38 is fixedly secured to one end of a valve operating rod 40 which extends thorugh the tubular rod 22. Adjacent the other end of the rod 40 there is fixedly secured a cylindrically shaped valve member 42 which is moved relative to ports 44 in the valve member 23. The valve member 23 together with the valve member 42 constitutes the so-called follow-up valve for controlling the operation of the motor 10. A spring 46, a portion of which is sleeved over the end of the rod 40, is interposed between one end face of the valve member 42 and a pin 48 mounted within the hub portion of the piston 14. The motor 10 is divided into compartments 50 and 52 by the piston 14 and the compartment 52 is connected to the intake manifold 54 of the internal combustion engine 56 of the car by a conduit 58 in which there may be incorporated a check valve 60.

Completing the description of the mechanism disclosed in Figures 1 to 3 inclusive the so-called valve operating and feel linkage 22, 24, 28, 32, 38 and 40 constituting a part of the power unit constituting my invention is in part actuated by a manually operated lever. This lever is disclosed as a clutch pedal 62 in Figures 1 and 3, and as a brake pedal 63 in Figure 2, however it is obvious that the rod 30 might be connected to any other control element of the power plant of the vehicle such as the change-speed transmission or the throttle. As disclosed in Figure 3 the forked end of the lower arm of the aforementioned lever 62 is pivotally connected to a pin 64 constituting the means interconnecting the links 28 and 32.

Describing now the operation of the clutch operating power means disclosed in Figures 1 and 3, which operation of course is the same as the operation of the brake operating power means of Figure 2, the driver, when he desires to disengage the clutch, depresses the clutch pedal 62. Referring now to Figure 3 this depression of the clutch pedal effects a movement of said pedal from the dotted line position shown in said figure to the full line position shown therein the link 28, in its angular movement, pivoting about its pivotal connection 29 with the rod 30; and this operation, by virtue of the lost motion connection between the links 32 and 24, results in a movement to the right of the valve member 42 and a simultaneous leftward movement of the valve member 23 to vent the chamber 50 of the motor to the atmosphere via openings 66 in the member 22, the interior of said member and the ports 44. Explaining the operation of the link 28 in pivoting about its connection with the rod 30 it is to be noted that an appreciable force is necessary to move said rod to the left to disengage the clutch; accordingly, it follows that the force necessary to open the valve, as described above, is less than the force necessary to effect a movement of said rod; therefore initial movement of the clutch pedal will result in an angular movement of the link 28 to open the valve. Now the compartment 52 of the motor is at all times in communication with the intake manifold 54 accordingly when the accelerator is released preparatory to disengaging the clutch said compartment is partially evacuated; for as is well known in this art when the accelerator is released to idle the engine 56 the intake manifold 54 of said engine is partially evacuated thereby becoming a source of vacuum to make possible an energization of the motor 10. It is to be noted at this juncture that when the clutch pedal and accelerator are both released the compartment 50 of the motor is also partially evacuated; for when the clutch pedal is released to the dotted line position disclosed in Figure 3 then the valve member 42 is positioned to the left of the ports 44 thereby interconnecting the compartment 50 with the compartment 52 via the interior of the valve member 23 and the hollow hub of the piston 14. The motor 10 is therefore what is known in the art as a vacuum suspended motor.

Continuing now the description of the cycle of operations of the power means disclosed in Figures 1 to 3 when the compartments 50 and 52 are, as above described, connected respectively to the atmosphere and source of vacuum then the piston 14 is subjected to a differential of pressures resulting in its movement to the right, Figure 3, to disengage the clutch. Now if the driver continues the depression of the clutch pedal 62 after the valve 42 is moved to the right to undercover the ports 44 then the loading of the piston 14 is maintained until the clutch is fully disengaged. If however the driver wishes to partially disengage the clutch, that is slip the same to effect a relatively slow movement of the car forwardly or backwardly, then he will arrest the movement of the clutch pedal after the valve is opened; and this operation will result in a lapping of the valve to arrest the movement of the piston.

Describing this operation of the mechanism when the movement of the valve member 42 is arrested the piston 14, because of the then existing loading of the same, will continue to move to the right, Figure 3, until the ports 44 are covered by the valve member 42; and this operation results in a cutting off of the flow of air into the compartment 50. The piston 14 then comes to a stop inasmuch as the system is then in a state of equilibrium. This lapping operation of the valve is known in the art as a follow-up operation of said valve.

If now the driver wishes to continue the clutch disengaging movement of the piston 14 to complete the disengagement of the clutch he again depresses the pedal 62 thereby again opening the valve to move the valve member 42 to the relative position disclosed in Figure 3.

It will be assumed now that the clutch pedal 62 has been moved to its position to fully disengage the clutch which operation of course results in the movement of the valve parts and piston to the positions disclosed in Figure 3. Then to effect an engagement of the clutch the driver will release the clutch pedal and this operation will result in a movement of the valve member 42 to the left, Figure 3, by the expansion of the spring 46. When the valve member 42 has been moved to register the ports 44 with the interior of the valve member 23 then the motor compartments 50 and 52 will be connected with each other whereupon air will flow from the compartment 52 into the compartment 50. The differential of gaseous pressures in said compartments is thus reduced thereby reducing the force maintaining the piston in the position disclosed in Figure 3. A spring 67, interposed between the piston 14 and the end member 68 of the cylinder 12 and compressed when the piston is in its clutch disengaged position, then expands and the force exerted by said spring together with the force exerted by the clutch springs results in a reengagement of the clutch. It is to be noted however, that the driver may arrest the clutch engaging movement of the piston 14 by merely arresting the clutch engaging movement of the pedal 62; and this operation results in the previously described lapping of the valve. It is apparent therefore that the vacuum suspended motor 10 of my invention may be either progressively energized or progressively deenergized to effect a so-called step by step disengagement or engagement of the clutch.

In the clutch engaging operation of the mechanism the piston 14 is moved to the left, Figure 3, to a position spaced a relatively short distance from the left end wall of the cylinder 12; for this position of the piston makes possible the above described movement of both parts of the valve 23, 42 when the same is opened to effect a clutch disengaging operation of the motor.

Describing now the operation of the force transmitting linkage 24, 28, 32 and 38 to effect the so-called feel operation of the power means disclosed in Figure 3 it will be noted that after the motor 10 is energized then the members 22 and 24 are placed under tension to exert a clutch disengaging force to the right, Figure 3, upon the pivotal connection 27 between the link 24 and the link 28. This operation tends to rotate the link 28 counterclockwise about its pivotal connection 29 with the rod 30; and to maintain the valve open it is, of course, necessary to exert a force upon the pivotal connection between the links 28 and 32 proportional to the aforementioned force exerted upon the pivotal connection 27 at the lower end of the link 28. The degree of force exerted upon the pivotal connection between the links 28 and 32 is dependent, of course, upon the moment arm distance, between the pivotal connection 29 and said pivotal connection between the links 28 and 32; and said force is also dependent upon the moment arm distance between the pivotal connection 29 and the pivotal connection 27. It is apparent therefore that the force which the driver must exert upon the clutch pedal to disengage the friction clutch is directly proportional to the force exerted by the piston 14 of the motor 10 in its operation of disengaging the clutch. This force exerted by the driver is known in the art as feel; for the driver is at all times during the operation of disengaging and engaging the clutch conscious of the degree of force exerted by the motor 10 and the clutch springs. It is also to be noted that the force opertive to effect a disengagement of the clutch is the sum of the forces exerted by the motor 10 and the physical effort of the driver.

If perchance the motor 10 should fail in its operation of disengaging the clutch then said clutch may be disengaged solely by the physical effort of the driver; for after the valve 23, 42 is opened that is cracked, then the pin 34 abuts the end of the slot 36 and the linkage 22, 24, 28, 32 and 40 goes solid to provide in effect a single link of force transmitting means. It follows therefore that if said linkage goes solid then the rod 30 may be moved to the right to disengage the clutch solely by the physical effort of the driver.

Referring now to Figure 4 there is disclosed in this figure another embodiment of my invention wherein, as with the power means disclosed in Figures 1 to 3 inclusive, a vacuum suspended double-ended motor is controlled by a follow-up valve mounted within said motor the linkage interconnecting the manually operated control member, the power element of the motor, the parts of the follow-up valve and the means to be operated providing means for effecting the follow-up operation of the valve and for effecting the desired feel to advise the driver of the degree of force being exerted by the motor.

Describing now the structure of the power means disclosed in Figure 4 there is provided a motor 70 including a double-ended cylinder 72 and a piston or power element 74. The end member 76 of the cylinder is connected with the intake manifold or other source of vacuum by a conduit 78 and to the piston 74 there is fixedly connected a valve member 80 constituting one end of a hollow tube 81 serving as a housing for a valve operating rod 82 slidably mounted therein. This rod 82 is connected at its outer end 84 to a manually operated member such as a brake or clutch pedal 86 and the inner end of said rod is enlarged to provide a cylindrically shaped valve member 88. This valve member 88 is extended to provide a thrust pin 90 which abuts the juxtaposed ends 92 and 94 of lever members 96 and 98 respectively; and said lever members are pivotally connected respectively to support members 100 and 102 which are fixedly connected to the piston 74. A U-shaped thrust member 104 abuts the lever members intermediate their ends and said thrust member is connected at its central portion to a rod 106 which is preferably connected to a piston 108 of a hydraulic motor 110 mounted on the end plate 76 of the motor 70. The fluid receiving chamber 112 of the motor 110 is connected, by a port 114 in the casing of said motor, with a suitable fluid reservoir, not shown, and by a port 116 with a conduit 118 connected to the clutch, brake or transmission operating means, not shown; the hydraulic motor 110 therefore constitutes a so-called master cylinder of said operating means.

The parts of the power unit disclosed in Figure 4 are shown in their off or motor deenergized position, compartments 120 and 122 of said motor being then both partially evacuated by virtue of their connection via the conduit 78, with the source of vacuum. The motor 70 is thus known as a vacuum suspended motor.

Describing now the operation of the power unit disclosed in Figure 4 when the driver desires to energize said unit to actuate the means to be operated he moves the valve operated rod 82 to the right in the direction of the arrow shown in said figure. This operation serves to move the valve member 88 relative to the valve member 80 to undercover ports 124 in the latter member thereby venting the compartment 120 of the motor 70 to the atmosphere via ports 126 in the tube 81, the interior of said tube and the valve ports 124. The piston 74 is then subjected to a differential of pressures inasmuch as the compartment 122 is at the time partially evacuated by virtue of its connection with the source of vacuum. The piston is by this operation moved to the right, Figure 4, thereby moving the piston 108 to the motor 110 to the right and forcing the power fluid within said motor out of the same and into the conduit 118. This operation of course effects an operation of the means to be operated whether it be the brakes, the friction clutch or the transmission of the vehicle. As with the power unit of Figure 3 if the driver now desires to arrest the movement of the means being operated he merely has to arrest the movement of the valve operating rod 82; and this operation, in the manner previously described, effects a follow-up to lap operation of the valve 80, 88 the valve ports 124 being covered by the valve member 88.

As to the operation of the linkage to effect the desired feel it will be noted from an inspection of Figure 4 that the force from the power element 74, applied to ends of the levers 96 and 98, is balanced by a force applied to the juxtaposed ends of said levers.

The parts of the mechanism disclosed in Figure 4 are preferably so constructed and arranged that each lever effects one half or substantially one half of the actuating force exerted by the combined physical effort of the driver of the car and the force exerted by the motor 70. As with the mechanism of Figure 1 it will be apparent that the actuating force exerted upon the piston 108 of the motor or so-called master cylinder 110 is the summation of the forces exerted by the piston of the motor 70 and the physical effort of the driver; and the degree of force exerted by the driver, known in the art as feel or the reaction force, is dependent upon the moment arms of the levers 96 and 98.

There is thus provided by either of the power units of Figures 3 and 4 a very simple, compact and efficient part of a power operated mechanism for operating any one of the controls of an automotive vehicle. In both of these units, and by unit is meant either the parts disclosed in Figure 4, the pedal and conduits execepted, or the vacuum motor and adjacent linkage disclosed in Figure 3, a double-ended vacuum suspended motor is controlled by a follow-up valve mounted within the motor the linkage for operating said valve also serving to obtain the desired feel control of the power means; and with both types of units the means to be operated may be applied or released in successive steps.

It is thought that the invention and many of its advantages will be understood from the foregoing description and though this invention has been described in connection with certain embodiments thereof it will be apparent that various changes may be made in the form, construction, and arrangement of the parts without departing from the spirit and scope of the invention or sacrificing all of its material advantages, the forms hereinbefore described being merely preferred embodiments.

I claim:

1. A power unit constituting a part of means for operating one of the several control members of an automotive vehicle said unit including a double-ended vacuum suspended motor comprising a cylinder and a power element which, together with the cylinder, divides the motor into two compartments, an air transmitting conduit connected with one of said motor compartments, a motor controlling follow-up valve, including two relatively movable members housed within the motor and operative, by a movement, of said members, to control the admission of air into the other of the motor compartments and to control the by-passing of air from the latter compartment to the first mentioned compartment, and force transmitting means for obtaining feel control and for operating said valve said force transmitting means comprising a valve operating member connected to one of the parts of the control valve and extending through one end of the cylinder of the motor, a valve operating rod housed within said member, and a plurality of closely connected links interconnecting said member and rod and mounted just outside the casing of the motor, one of said links operating as a lever and serving, by virtue of its connection with the remaining links and with the control member, to exert a reactionary force advising the driver of the vehicle of the degree of force exerted by the motor during the operation of said control member.

2. A power unit constituting a part of means for operating one of the several control members of an automotive vehicle said unit including a double-ended vacuum suspended motor comprising a cylinder and a power element which, together with the cylinder, divides the motor into two compartments, an air transmitting conduit connected with one of said motor compartments, a spring housed within said latter compartment said spring serving to bias the power element toward one end of the cylinder, a motor controlling two part follow-up valve housed within the motor and operative to control the admission of air into the other of said motor compartments and to control the by-passing of air from the latter compartment to the first mentioned compartment, and force transmitting means for operating the parts of said valve comprising a valve operating tube connected to one of the two parts of the control valve and extending through one end of the cylinder of the motor, a rod housed within said tube and connected to the other valve part, and a plurality of links, closely connected together, interconnecting said tube and rod and mounted just outside the casing of the motor, said links including an angular shaped link secured intermediate its ends to one end of the tube, a link pivotally connected at one of its ends to one end of said angular shaped link and extending substantially at right angles thereto, a link pivotally interconnecting the other end of said second mentioned link with the other end of the angular shaped link and a link interconnecting the central portion of said interconnecting link with one end of the aforementioned valve operating rod.

3. A single acting pressure differential operated vacuum suspended motor comprising a double-ended casing member provided with a port in one end wall thereof, said port adapted to receive a conduit connected with a source of vacuum, a power element housed within said casing, a hollow rod extending, at one of its ends, within and secured to the central portion of said power element and also extending through one end wall of said casing, said rod being provided with an opening immediately adjacent said central portion, a valve operating rod slidably mounted within said hollow casing, and feel means connected to adjacent ends of the two rods, said feel means including an angular shaped link mounted on one end of the hollow rod, a link pivotally connected at one of its ends to one end of said angular shaped link and pivotally connected, at its other end, to one end of a manually actuated member and to a third link, which third link is in turn pivotally connected, by a lost motion connection, to one end of the angular shaped link, together with a strap interconnecting the central portion of the aforementioned third link and one end of the valve operating rod.

HAROLD W. PRICE.

REFERENCES CITED

The following references are of record in the file of this patent:

UNITED STATES PATENTS

| Number | Name | Date |
|---|---|---|
| 1,620,513 | Bragg | Mar. 8, 1927 |
| 2,152,084 | Paine | Mar. 28, 1939 |
| 2,227,273 | Price | Dec. 31, 1940 |
| 2,284,298 | Newton | May 26, 1942 |
| 2,293,059 | Hirvonen | Aug. 18, 1942 |
| 2,365,471 | Ingres | Dec. 19, 1944 |

FOREIGN PATENTS

| Number | Country | Date |
|---|---|---|
| 620,663 | France | Jan. 22, 1927 |
| 742,236 | France | Dec. 27, 1932 |

Certificate of Correction

Patent No. 2,457,721. December 28, 1948.

HAROLD W. PRICE

It is hereby certified that errors appear in the printed specification of the above numbered patent requiring correction as follows:

Column 2, line 33, for "thorugh" read *through*; column 6, line 36, for the words "to the motor" read *of the motor*; column 7, line 2, for "execepted" read *excepted*; line 33, claim 1, before "of said" insert *of both*;

and that the said Letters Patent should be read with these corrections therein that the same may conform to the record of the case in the Patent Office.

Signed and sealed this 17th day of May, A. D. 1949.

[SEAL]

THOMAS F. MURPHY,
*Assistant Commissioner of Patents.*